United States Patent Office 3,291,753
Patented Dec. 13, 1966

3,291,753
CATALYST PREPARATION
Charles E. Thompson, Fanwood, N.J., assignor to Esso Research and Engineering Company, a corporation of Delaware
No Drawing. Filed Sept. 19, 1963, Ser. No. 310,147
9 Claims. (Cl. 252—447)

This invention relates to improvements in electrochemical cells and particularly to those cells designed for direct production of electrical energy through electrochemical oxidation of a combustible or nonmetallic fuel. More particularly, this invention relates to a method of making a highly efficient electrode catalyst system. In particular, this invention relates to a method and catalyst made by a particular process of reducing the metal with a trisubstituted silane and then treating the catalyst in a CO atmosphere and subsequently in a $H_2$ atmosphere.

The term "fuel cell" is used herein and in the art to denote a device, system, or apparatus in which the chemical energy of a fluid combustible fuel such as hydrogen, carbon monoxide, or an organic compound containing hydrogen in its molecular structure is electrochemically converted to electrical energy at a nonsacrificial or inert electrode. The true fuel cell is adapted for continuous operation and is supplied with both fuel and oxygen from sources outside the cell proper. Such cells include at least two nonsacrificial or inert electrodes, functioning as an anode and a cathode, respectively, which are separated by an electrolyte which provides ionic conductance therebetween, conduction means for electrical connection between anode and cathode external to the electrolyte, means for admitting a fluid fuel into dual contact with the anode and electrolyte and means for admitting oxygen in duel contact with the cathode and electrolyte. Where necessary or desired, the electrolyte compartments are divided into an anolyte and a catholyte compartment by an ion permeable partition or ion exchange membrane or a plurality of same. Thus, in each such cell a fuel is oxidized at the anode and an oxidant is reduced at the cathode upon receiving electrons from the anode.

Electrodes of the type hereinbefore and hereinafter referred to are also employed in electrolytic cells which unlike the aforementioned fuel cells do not provide a net production of electrical energy, but in which an organic fuel is oxidized electrochemically at the anode thereof. In such cells, a direct current of electrical energy from an external source, namely a fuel cell, a storage battery or an alternating current rectifier, is admitted to the electrical circuit of the cell to provide the necessary electrical current to operate the cell. Such cells can be used for the electrochemical production of various organic chemicals, such as the conversion of alcohols or hydrocarbons to ketones.

Electrodes for use in these cells vary considerably in both design and composition. Although a single metal structure such as platinum, sheet or screen or a structure of porous carbon such as a flat sheet or a porous carbon cylinder can be used alone, electrodes must commonly comprise a conductive base structure with a metal catalyst chemically and/or physically bound to the surface of the base. Such electrodes also include those upon which the catalyst is laid down by electrodeposition, and those which are impregnated with catalyst by soaking the base in a solution comprising a suitable catalyst yielding material, decomposing the adsorbed material and/or reducing the resulting absorbed metal-containing material to elemental metal or metal oxide. The latter technique is conventional in the preparation of porous carbon electrodes bearing a metal catalyst.

Noble metals, particularly platinum, are effective catalysts in both oxidation-reduction reactions wherein the cell employs either a basic or acid electrolyte.

It has now been discovered that surprisingly highly effective catalysts and/or electrodes for use in cells of the type hereinbefore described can be prepared in a three-step process comprising reducing the metals with a trisubstituted silane, subsequently treating the catalyst with CO at a temperature of 800° F. and then treating it with hydrogen gas at 1600° F. This procedure gives you highly effective single metal catalysts, such as platinum or palladium or iridium and mixtures and alloys of metals, such as platinum-iridium, platinum-gold, platinum-rhenium, palladium-rhodium.

One problem facing the art heretofore was how to make a more efficient catalyst for use in an acid system. In order to have a catalyst that is not attacked by the acid, one must use a noble metal. However, noble metals are both expensive and of limited availability; therefore, if one is to use noble metals as catalysts, they must be made highly efficient, i.e., have a large catalytic activity per unit volume. One of the best methods to date for making efficient catalyst has been to saturate a carbon body with a metal salt solution and then reduce the metal ion of the salt to the free metal. This procedure affords an effective catalyst, but one which is not very efficient since the procedure produces relatively large metal crystals or particles.

It has now been found that highly efficient catalysts can be made by the process of the instant invention which affords a highly active metal catalyst in a very finely divided form.

The instant process consists of absorbing a metal salt or a mixture of metal salts onto a carbon support. The carbon support is then treated with a trisubstituted silane and then heated to a temperature of 800° F. in a CO atmosphere and then, subsequently, heated to 1600° F. in a hydrogen atmosphere. Trisubstituted silanes, such as triethyl, tri-n-butyl, tri-benzyl or triphenyl silane, may be used as reducing agents. The silanes are dissolved in a suitable solvent such as an alcohol or ether. The temperature of the solution may be any temperature up to the boiling point of the solution. Temperatures of from about 30 to 190° F. are preferred, and most preferably, from 130 to 185° F. The concentrations of the metal solutions may be from 0.01 molar to saturation, preferably from 0.1 to 5 molar and most preferably from 0.25 to 3 molar. The concentration of each salt solution is dependent upon the catalyst to be produced. For example, if you want to produce a simple platinum catalyst, then a saturated solution could be used. If an alloy of 80% platinum and 20% gold is produced, the solution of the salts would be prepared by using 80 mole percent platinum salt and 20 mole percent gold salt.

In accordance with this invention, a catalyst may consist of a single metal or of several metals as either a mixture or an alloy. The metals may be either noble metals or base or one or more noble metals with one or more base metals. The noble metals of this invention are the metals of the platinum group, that is, platinum, palladium, iridium, rhodium, ruthenium and osmium and also gold, silver and rhenium. The base metals of this invention include the transition metals such as iron, cobalt, nickel, molybdenum, chromium, manganese, tungsten, titanium, zinc, copper cadmium and vanadium. It it understood that the one skilled in the art of course, would not use a base metal where he is utilizing a strong acid electrolyte. If one is utilizing a strong acid electrolyte, then he would use a metal which would not be attacked by the electrolyte. If the operator of the cell is using a basic electrolyte, then, of course, the base metals would be suitable, in fact, maybe even preferable since they would be cheaper.

This process is a preferred process in those cases where base metal cannot be eelctrically codeposited with a noble metal or reacts chemically with a noble metal such as molybdenum with platinum. This process is also useful for a deposition of platinum with other noble metals, such as iridium or ruthenium, which cannot be effectively electrodeposited alone or in mixture with platinum.

The instant catalyst can be used by applying it to known existing electrodes or as a component in the production of an electrode. The catalyst made by this process can be applied as a continuous adherent coating upon nonporous electrodes, such as metal sheets or wire. This may be done by mixing the catalyst with water or a low boiling organic liquid, such as acetone, methylethyl ketone etc., and the suspension is applied to a roughened metal surface and allowed to dry. In another modification, the catalyst is mixed with an organic binder, such as small particles of polytetrafluoroethylene, polypropylene, polyethylene or other suitable halogenated polymers. The mixture is then applied to the surface to be coated and the temperature is either raised to the appropriate sintering temperature of the binder employed so as to cause the catalyst to be stuck to the surface or the mixture of organic binder and catalyst is applied to the surface and allowed to dry. The catalyst of this invention also can be used by mixing the catalyst with a binder material, such as polytetrafluoroethylene, polypropylene, polyethylene and a compound, such as ammonium oxalate. This mixture is then pressed into a desired shape and then heated gradually from room temperature up to the decomposition temperature of ammonium oxalate. This gives a shaped body having pores therein due to the escaping decomposed ammonium oxalate. This shaped porous body is a very efficient electrode.

This invention is more fully illustrated by the following examples which are illustrative only and should not be construed as limitations on the true scope of the invention as set forth in the claims.

*Example 1*

Two electrodes were prepared as follows: two porous carbon cylinders were immersed in an aqueous solution containing 5 grams of chloroplatinic acid and 0.2 gram of gold chloride. The pressure on the system was reduced to 1 mm. of mercury for ten minutes and then allowed to return to one atmosphere. The cylinders were allowed to soak for 14 hours at 180 F., then dried at 230° F. They were then immersed in a solution consisting of 18 grams of tribenzyl silane in 150 ml. of ethyl alcohol at 160° F. for one hour. They were then washed thoroughly with alcohol and dried under nitrogen. They were then treated for 3 hours at 800° F. under CO and 3 hours at 1600° F. under $H_2$.

The electrodes were then evaluated by testing their ability to oxidize ethane in a fuel cell at 180° F. using a 30 weight percent sulfuric acid electrolyte. The performance was as set forth in the following table.

TABLE I

| Electrode | Polarization at Indicated Amps/ft.² | | | |
|---|---|---|---|---|
|  | 0 | 5 | 10 | 20 |
| No. 1 | 0.21 | 0.37 | 0.43 | 0.54 |
| No. 2 | 0.21 | 0.38 | 0.43 | 0.56 |

The above table shows that this invention produces uniform electrodes.

*Example 2*

Finely divided carbon was immersed in an aqueous solution containing five grams of chloroplatinic acid and 0.2 grams rhenium heptoxide. Finely divided carbon was allowed to stand in the solution for 4 hours at 185° F. The carbon particles were then removed from the solution and dried at 230° F. They were then immersed in a solution consisting of 20 grams of triphenyl silane in 180 ml. of ethyl alcohol at 160° F. for 1 hour. The carbon particles were then washed thoroughly with alcohol and dried under a nitrogen atmosphere. Then they were treated for 3 hours under a CO atmosphere at 800° F. and then under a hydrogen atmosphere for 3 hours at 1600° F. The catalyst was then used as a catalyst for a fuel cell electrode by impressing the catalyst onto a gold-coated membrane.

*Example 3*

Finely divided carbon was soaked in an aqueous solution containing 95 weight percent chloroplatinic acid and 5 weight percent iridium chloride for 4 hours at a temperature of 185° F. The finely divided carbon was then removed from the solution and dried at 240° F. The carbon was then immersed in a solution containing 19 grams of tri-n-butyl silane in 160 ml. of ethyl alcohol at 73° F. for one hour. The carbon was then washed thoroughly with alcohol and dried under nitrogen atmosphere. The carbon was then treated for three hours at 800° F. under a carbon monoxide atmosphere and subsequently for three hours at 1600° F. under a hydrogen atmosphere. Two grams of the catalyzed carbon was mixed with one gram of tetrafluoroethylene polymer and one gram of ammonium oxalate as a filler. This mixture was intimately mixed in a ball mill and then pressed at 3000 p.s.i. to form the solid wafer. The wafer was then slowly heated from room temperature to 160° C. in air for 1 hour at which time the ammonium oxalate was vaporized and left the structure. As ammonium oxalate was decomposed and left the structure as a vapor, it formed pores in the wafer. The porous structure was then used as the anode in a fuel cell. The fuel cell utilized 30 weight percent sulfuric acid as electrolyte and was operated at 100° C. Ethylene was used as the fuel. Results of this run are set forth in Table II below.

TABLE II

| Fuel | Polarization at Indicated Amps, 1 ft.² | | | |
|---|---|---|---|---|
|  | 0 | 20 | 50 | 100 |
| Ethylene | 0.12 | 0.38 | 0.49 | 0.60 |

*Example 4*

An electrode prepared as set forth in Example 3 was tested as a cathode of a fuel cell. Thirty weight percent sulfuric acid was used as the electrolyte in the cell, ethanol was the fuel and air was the oxidant. The results of that test are set forth in Table III.

TABLE III

| Oxidant | Polarization at Indicated Amps/ft.² | | | |
|---|---|---|---|---|
|  | 0 | 10 | 50 | 100 |
| Air | 0.23 | 0.27 | 0.37 | 0.45 |

*Example 5*

An electrode prepared in accordance with this invention was tested as an anode in a half cell employing an organic fuel, 85 weight percent phosphoric acid electrolyte and operated at 150° C. Three runs were made with this cell. In the first run propane was employed as a fuel; in the second run ethane was employed as a fuel and in the third run isobutane was employed as a fuel. The electrode was prepared by intimately mixing two grams of finely divided tetrafluoroethylene polymer, two grams of platinum-iridium impregnated carbon particles and four grams of ammonium carbonate. The mixture was intimately mixed and pressed at a pressure of 3000 p.s.i. to form a solid wafer. The wafer was then gradually heated to 60° C. in air for one hour during which time ammonium carbonate was vaporized and left the structure. The porous structure was then used as the anode in the fuel cell described supra. The results of the experiment are set forth in Table IV.

TABLE IV

| Fuel | Polarization at Indicated Amps/ft.$^2$ | | | |
|---|---|---|---|---|
| | 0 | 5 | 10 | 20 |
| Propane | 0.12 | 0.24 | 0.30 | 0.54 |
| n-Hexane | 0.12 | 0.30 | 0.38 | 0.68 |
| Ethane | 0.09 | 0.23 | 0.29 | 0.55 |

What is claimed is:

1. A method of making catalyzed carbon which comprises the steps of (a) absorbing from 1 to 3 noble metal compounds onto carbon, (b) contacting said absorbed carbon with a trisubstituted silane selected from the group consisting of trialkyl silane and triaryl silane, (c) heating the product of step (b) in a carbon monoxide atmosphere at about 750° to 850° F., and (d) heating the product of step (c) in a hydrogen atmosphere at about 1500° to 1700° F.

2. A method in accordance with claim 1 wherein said trisubstituted silane is tribenzyl silane.

3. A method in accordance with claim 1 wherein said trisubstituted silane is triethyl silane.

4. A method in accordance with claim 1 wherein said trisubstituted silane is tri-n-butyl silane.

5. A method in accordance with claim 1 wherein said trisubstituted silane is triphenyl silane.

6. A method in accordance with claim 1 wherein said carbon is a porous carbon body.

7. A method in accordance with claim 1 wherein said carbon is finely divided carbon.

8. A method in accordance with claim 1 wherein step (a) chloroplatinic acid is absorbed onto carbon.

9. A method in accordance with claim 1 wherein step (a) a mixture of chloroplatinic acid and iridium chloride is absorbed onto carbon.

References Cited by the Examiner

UNITED STATES PATENTS

| | | | |
|---|---|---|---|
| 2,600,379 | 6/1952 | Doumani et al. | 252—447 X |
| 2,799,708 | 7/1957 | Oakley et al. | 252—447 X |
| 2,920,050 | 1/1960 | Blacet et al. | 252—447 |
| 3,077,508 | 2/1963 | Oswin | 136—121 |
| 3,098,762 | 7/1963 | Roblee et al. | 117—228 |

FOREIGN PATENTS

| | | |
|---|---|---|
| 1,047,180 | 12/1958 | Germany. |
| 781,533 | 8/1957 | Great Britain. |

MILTON WEISSMAN, *Primary Examiner.*

MAURICE A. BRINDISI, OSCAR R. VERTIZ,
*Examiners.*

H. S. MILLER, A. J. GREIF, *Assistant Examiners.*